United States Patent [19]

Miller et al.

[11] Patent Number: 5,428,879
[45] Date of Patent: Jul. 4, 1995

[54] METHOD OF MAINTAINING PARALLELISM OF A PAIR OF ARM FORMED ON A VEHICLE DOOR HANDLE COMPONENT

[75] Inventors: Leonard G. Miller, Orchard Lake; Owen H. Pope, Lapeer, both of Mich.

[73] Assignee: Molmec, Inc., Walled Lake, Mich.

[21] Appl. No.: 201,407

[22] Filed: Feb. 24, 1994

[51] Int. Cl.6 .............................................. B23P 25/00
[52] U.S. Cl. ..................................... 29/418; 29/527.3; 425/403.1; 427/289
[58] Field of Search ................ 29/418, 423, 458, 460, 29/527.2, 559, 527.3; 16/112, 113, 124; 118/503; 427/289, 393.5, 424, 425; 264/161; 425/403.1, DIG. 109, 806

[56] References Cited

U.S. PATENT DOCUMENTS

| | | | |
|---|---|---|---|
| 4,634,161 | 1/1987 | Fukasawa et al. | 292/336.3 |
| 4,693,769 | 9/1987 | Fritz et al. | 264/161 |
| 4,914,779 | 4/1990 | Nakai et al. | 16/124 |
| 5,088,609 | 2/1992 | Frye | 118/503 |

Primary Examiner—S. Thomas Hughes
Assistant Examiner—Kenneth J. Hansen
Attorney, Agent, or Firm—Reising, Ethington, Barnard & Perry

[57] ABSTRACT

A door handle component made of a thermoplastic material and a method of maintaining parallelism of the pair of arms forming a part of the component during the manufacture thereof by having the two arms rigidly interconnected by a cross member which is integrally formed with the arms.

4 Claims, 3 Drawing Sheets

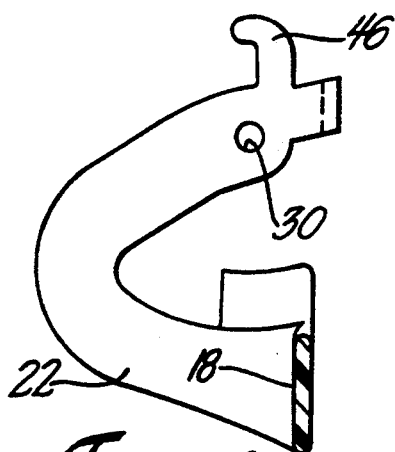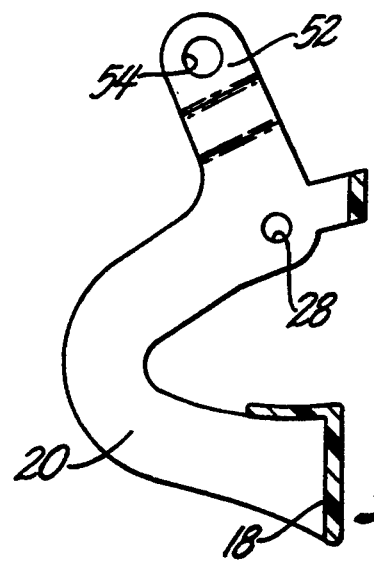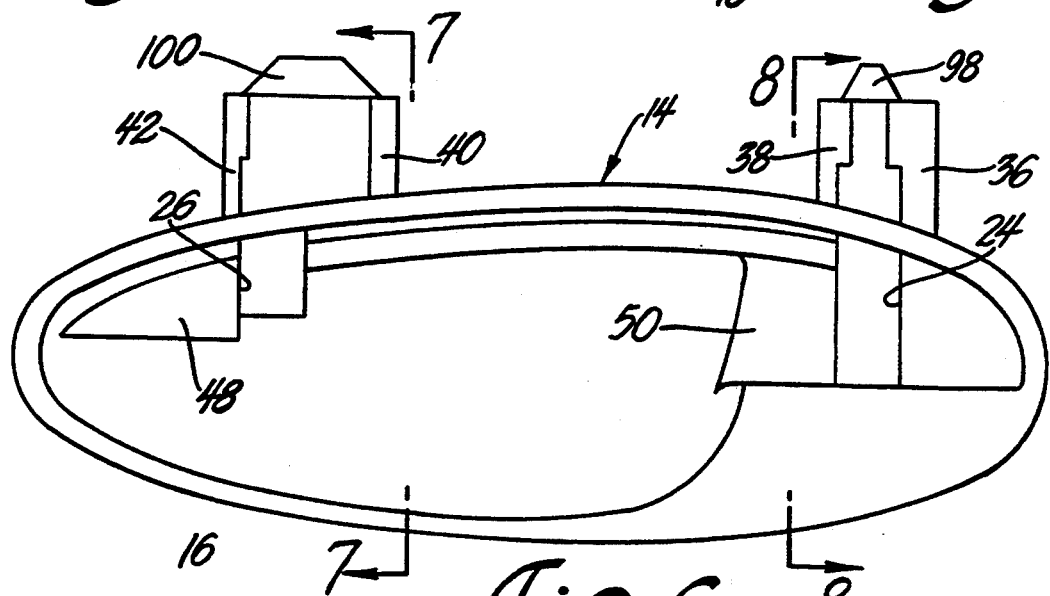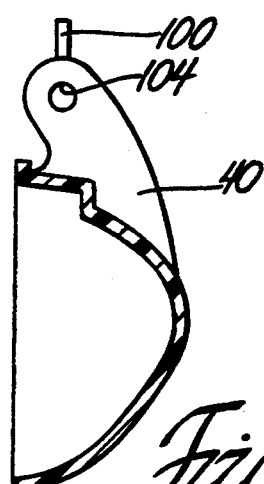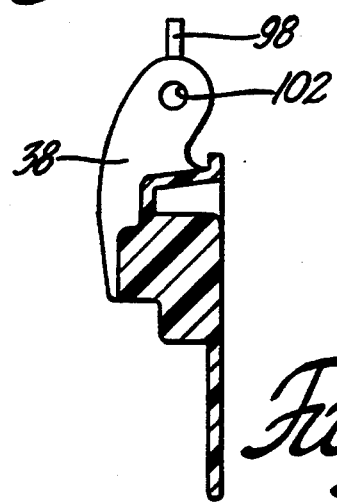

METHOD OF MAINTAINING PARALLELISM OF A PAIR OF ARM FORMED ON A VEHICLE DOOR HANDLE COMPONENT

This invention concerns door handles for vehicles and more particularly relates to the construction of a door handle component and a method of maintaining the attached arm portions of the door handle component dimensionally stable and parallel while molding and painting the component.

BACKGROUND OF THE INVENTION

One type of door handle assembly being utilized on a number of current automotive vehicles includes an escutcheon which is secured to the door structure and is provided with a pair of laterally spaced openings. A pull type door handle is located within the escutcheon and has a pair of hinge arms which extend through the openings in the escutcheon for pivotal support by a pair of pins mounted in support arms integrally formed with the back surface of the escutcheon. A spring is located between one of the hinge arms and one of the support arms for normally maintaining the door handle within the escutcheon and for returning the door handle into the escutcheon after it has been pulled outwardly for opening the door.

A door handle assembly of the type described above can be made of a plastic material or a metallic material. When made of either of these materials, it is important to assure that the hinge arms of the door handle and also the support arms formed with the escutcheon maintain parallelism and dimensional stability so the main parts of the door handle assembly fit properly together and provide uniform clearances and gaps in the outer appearance area of the assembly. It has been found that maintaining parallelism and dimensional stability of the arms can be a problem when the door handle components are made of a thermoplastic material, and the problem can arise during the manufacture of the components and particularly during the molding and painting of the components.

In this regard, during the molding operation, retraction of the pins forming the hinge openings in the pivot arms of the door handle components (which occurs when the part is at temperature of approximately 220 degrees Fahrenheit) can result in a loss of parallelism of the pivot arms. In addition, during the cooling phase of the molded component, high internal stresses can occur at the juncture of the arms with the main base portion of the door handle component where the shape of the part has a marked change in section. These internal stresses will tend to be relieved when the components pass through the high temperature heating oven which serves to dry and cure the paint during the painting operation of the part. As a consequence, the pivot arms can warp causing a further loss of parallelism with resultant misalignment as described above of the finished door handle components when assembled.

SUMMARY OF THE INVENTION

The present invention contemplates a plastic door handle component having a pair of outwardly projecting arms formed therewith and a method of preventing warpage and distortion of the arms by having the arms at the edges thereof joined together by a cross member which is integral with the arms and formed therewith during the molding operation. In one form of the invention, the cross member will have at least one section thereof provided with an enlarged portion which can serve as a holding area permitting the door handle component to be supported as it is being conveyed through a paint station and a heat oven, the latter of which serves to cure the paint deposited on the component during the painting process. After the door handle component passes through the various stations during the painting process, the cross member is severed from the arms by a cutting operation so as to present a door handle component ready for accurate alignment and connection with other door handle components to form a complete door handle assembly for mounting to a vehicle door.

Accordingly, an object of the present invention is to provide a new and improved door handle component made of a thermoplastic material and a method of maintaining parallelism of the pair of arms forming a part of the component during the manufacture thereof by having the two arms rigidly interconnected by a cross member which is integrally formed with the arms.

Another object of the present invention is to provide a new and improved door handle component made of a thermoplastic material and a method of maintaining parallelism and dimensional stability of the pair of arms forming a part of the component by interconnecting the adjacent arms with an intermediate member which is integrally formed with the arms and has the intermediate member formed with a section which allows the component to be supported while it passes through a heat oven during a painting operation.

A further object of the present invention is to provide a new and improved door handle component made of a thermoplastic material and a method of maintaining parallelism and dimensional stability of the pair of arms forming a part of the component that includes the provision of an integral cross member for rigidly joining the arms together so that pins providing pivot connections for the arms can be retracted during the molding operation without causing the arms to lose parallelism and also allowing the cross member to maintain dimensional stability of the arms when the component is subjected to high temperatures during a painting operation.

A still further object of the present invention is to provide a new and improved door handle component made of a thermoplastic material and having a least one pair of outwardly projecting pivot arms and a method of preventing the arms from losing parallelism during the molding of the component and also during the painting thereof characterized in that the arms of the component are integrally formed with and rigidly joined together by a cross member which at all times maintains parallelism of the arms and is connected at its ends to the arms with a minimum amount of material so that, after the component is painted and passes through a heat oven, the cross member can be severed from the arms without exposing any appreciable amount of unpainted area on the arms.

Other objects and advantages of the present invention will be apparent to those skilled in the art from a reading of the following detailed description when taken with the drawings in which:

BRIEF DESCRIPTION OF THE DRAWINGS

FIG. 4 is a sectional view taken on line 4—4 of FIG. 2;

FIG. 5 is a sectional view taken on line 5—5 of FIG. 2;

FIG. 6 is an elevational view of the escutcheon portion of the door handle assembly seen in FIG. 1 formed in accordance with the invention;, FIG. 7 is a cross sectional view of the escutcheon portion of the door handle assembly taken on line 7—7 of FIG. 6;

FIG. 8 is a cross sectional view of the escutcheon portion of the door handle assembly taken on line 8—8 of FIG. 6;

DETAILED DESCRIPTION OF THE PREFERRED EMBODIMENT

Figure 1:
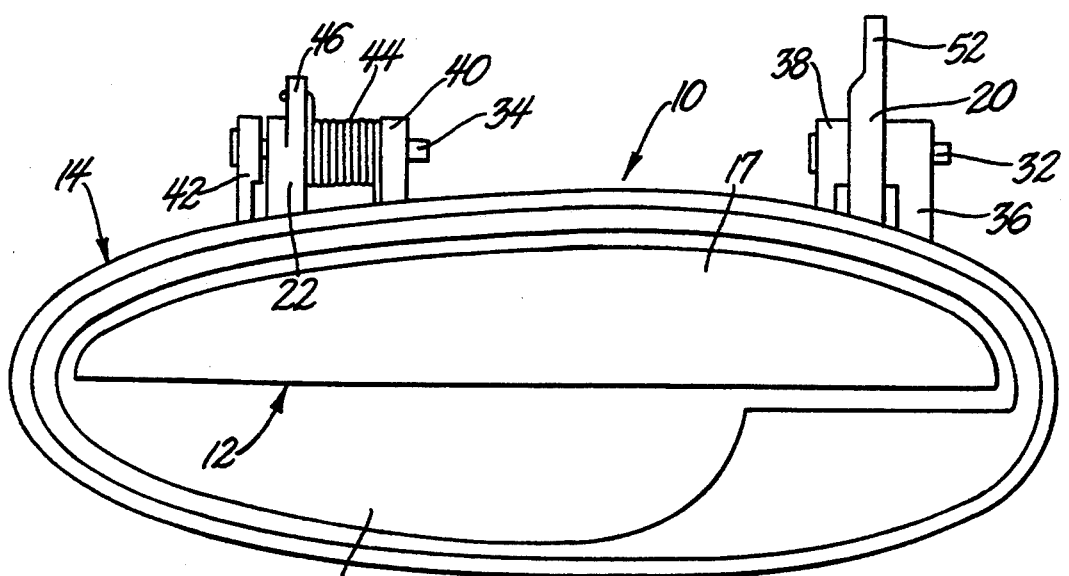
FIG. 1 is an elevational view showing a door handle assembly which includes a pair of door handle components made in accordance with the present invention.
Figure 2:
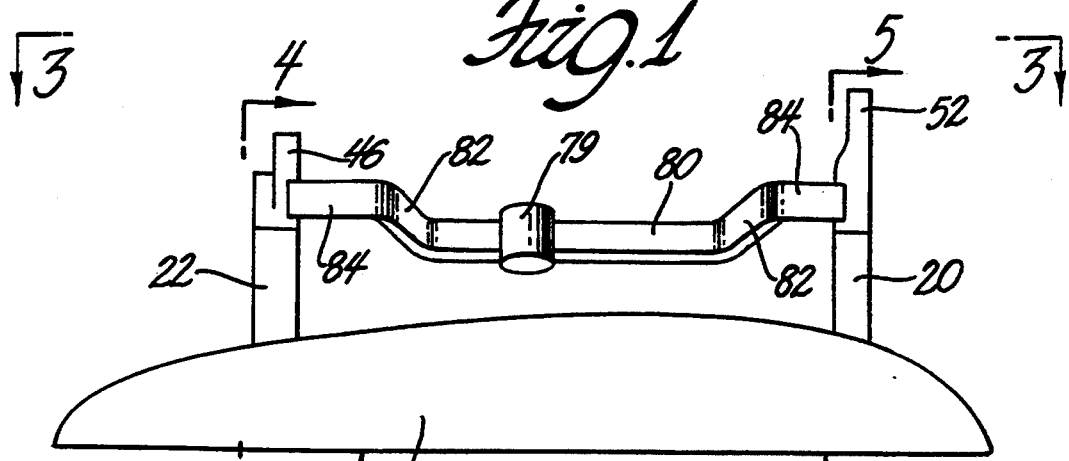
FIG. 2 is an elevational view of the door handle portion of the door handle assembly seen in FIG. 1 formed in accordance with the invention prior to being assembled with the other parts of the door handle assembly.

Referring now to the drawings and more particularly to FIG. 1 thereof, a door handle assembly 10 of the general type found on current automotive vehicles is shown having a pair of major components made of a thermoplastic material. One of the components is a door handle 12 and the other an escutcheon 14. The escutcheon 14 is adapted to be secured to the frame structure of an automobile door (not shown) and is formed with a cavity 16 in which is located the grip or base portion 17 of the door handle 12. The rear or inner surface 18 of the grip portion 17 of the door handle 12 is integrally formed with a pair of laterally spaced pivot arms 20 and 22 which extend through a pair of access openings 24 and 26, respectively, formed in the cavity 16 of the escutcheon. The pivot arms 20 and 22 of the door handle 12 can be seen in FIGS. 2 and 3 while the access openings 24 and 26 of the escutcheon 14 are shown in FIG. 6. In this regard, it will be noted that the door handle 12 and escutcheon 14 shown in FIGS. 2-8 are made in accordance with the present invention and take a form which, in a certain respects, differs from the final configuration of these two components as seen in FIG. 1. The difference and the reason for the difference will become apparent as the description of the present invention proceeds.

As seen in FIGS. 4 and 5, the pivot arms 20 and 22 of the door handle 12 are respectively formed with horizontally aligned openings 28 and 30 which allow the arms 20 and 22, as seen in FIG. 1, to be connected to a pair of pivot pins 32 and 34. The pivot pins 32 and 34 are respectively fixed between a pair of support arms 36 and 38 and a pair of support arms 40 and 42. As best seen if FIGS. 6, 7 and 8, the support arms 36 and 38 are integrally formed with the inner or rear surface of the escutcheon 14 adjacent one end thereof and the other support arms 40 and 42 are integrally formed with the inner surface of the escutcheon 14 adjacent the other end thereof. A coil spring 44 is wound about the pivot pin 34 and has one end thereof engaging a tab 46 formed on the pivot arm 22 of the door handle 12 and the other end of the coil spring 44 engaging the rear surface of the escutcheon 14 so as to continuously bias the grip portion 17 of the door handle 12 into contact with a pair of horizontally spaced seating portions 48 and 50 of the escutcheon 14. As is conventional, the end portion 52 of the pivot arm 20 is formed with an opening 54 adapted to receive a bushing (not shown) therein that is adapted for pivotal connection with the operating linkage of the vehicle door latch (neither of which is shown) so when the grip portion 17 of the door handle 12 is manually grasped and pulled outwardly and upwardly relative to the escutcheon 14, the door is unlatched allowing the vehicle door to be opened. When the grip portion 17 is released, the spring 44 serves to return the door handle 12 to the normal position shown in FIG. 1.

Figure 9:
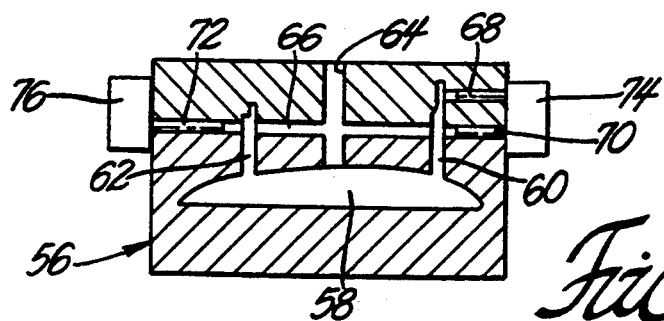
FIG. 9 is a schematic view of a mold half used for forming the door handle portion seen in FIGS. 2-5.

As seen in FIGS. 2-5, the detailed construction of the door handle 12 is shown after it is ejected from a mold. In this regard, FIG. 9 shows one mold half 56 of an injection molding apparatus used for molding the door handle 12. As seen, the mold half 56 is formed with a door handle cavity having a configuration which is the same as the configuration of the door handle 12. The door handle cavity includes a grip portion cavity 58 connected with a pair of pivot arm cavities 60 and 62. A gate 64 is formed in the mold half 56 which connects to the cavity 58 and a runner 66 which, in turn, connects with the pivot arm cavities 60 and 62 formed in the mold half 56. The mold half 56 also includes three pins 68, 70 and 72 connected to actuators 74 and 76 which are adapted to move the pins 68-72 into and out of the pivot arm cavities 60 and 62 for forming the aforementioned openings 28, 30 and 54 in the pivot arms 20 and 22. It will be understood to those skilled in the art that another mold half (not shown) cooperates with the mold half 56 to form the door handle 12 and is adapted to be locked to the mold half 56 prior to supplying the thermoplastic material to the mold.

Thus, in forming the door handle 12, the two mold halves in the injection molding apparatus are initially closed and the pins 68-72 are located in the pivot arm cavities 60 and 62. This is then followed by injecting the plastic material in a liquid state and at a temperature of approximately 480 degrees Fahrenheit into the closed mold via the gate 64. After the plastic material has solidified sufficiently for the door handle 12 to maintain its shape, the pins 68-72 are retracted from the pivot arm cavities 60 and 62 and the door handle 12 is ejected from the mold half 56 by ejector pins (not shown) strategically located in the mold half 56.

As a result of the molding process described above, the door handle 12 takes on the configuration shown in FIGS. 2-5. It should be apparent that the pins 70 and 72 of the mold half provide the hinge openings 28 and 30 in the pivot arms 20 and 22 through which the hinge pins 32 and 34 extend. In addition, the pin 68 provides the opening 54 for the bushing in pivot arm 20. Moreover, it should be apparent that the door handle 12 is also formed with a cross member 78 provided by the runner 66 that rigidly interconnects the pivot arms 20 and 22. The gate 64, which provides the main supply of the liquid thermoplastic material for forming the door handle 12, leaves a cylindrical branch member which is integral with the cross member 78. The branch member has its parts adjacent the cross member 78 cut off so as to leave a stub type cylindrical section 79 intermediate the ends of the cross member 78.

Figure 3:
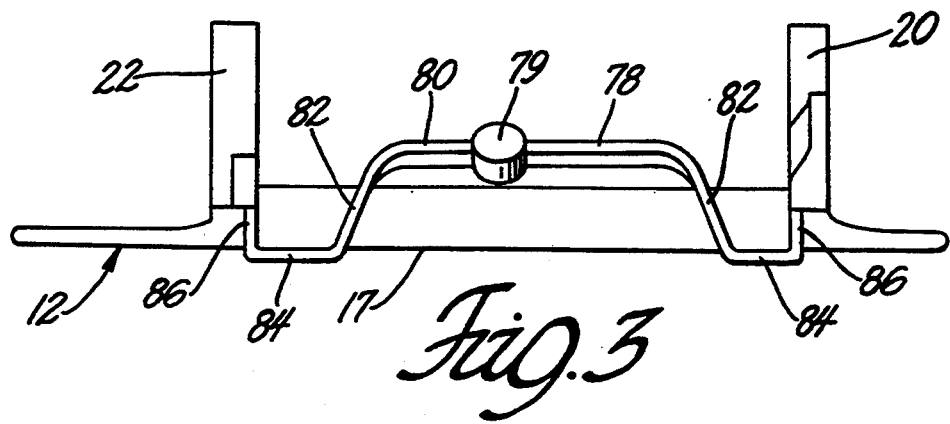
FIG. 3 is a plan view of the door handle portion taken on line 3—3 of FIG. 2.
Figure 10:
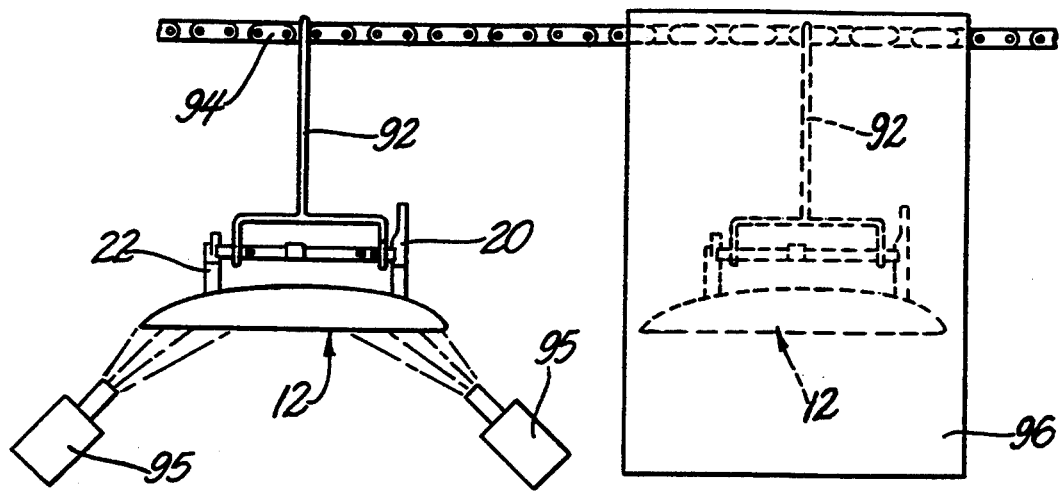
FIG. 10 is a partial view of a conveyor system moving the door handle portion of FIGS. 2-5 past a paint station and into a heat oven.
Figure 11:
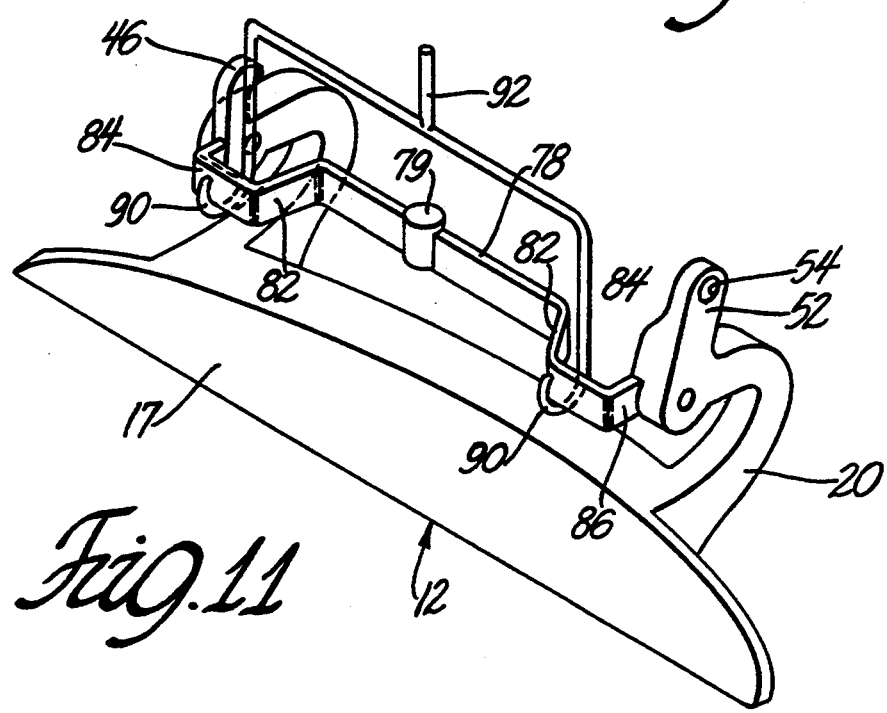
FIG. 11 is an enlarged perspective view showing one of the door handle portions supported in position by one of the racks shown in FIG. 10.

One advantage of having the cross member 78 is that it serves to prevent the pivot arms 20 and 22 from losing parallelism when the pins 68–72 of the mold half 56 are being retracted from the pivot arm cavities 60 and 62. Another advantage in having the cross member 78 formed with the pivot arms 20 and 22 is that it serves as a holding member during the painting of the door handle. In this regard, it will be noted that the cross member 78 includes a straight section 80 integral with a pair of connector portions each of which is generally "J" shaped as seen in FIG. 3. Each connector portion includes a leg section 82, a foot section 84 and a toe section 86 which is integral with the associated pivot arm of the door handle 12. As seen in FIGS. 10 and 11, the cross member 78 has its pair of foot sections 84,84 mounted on J-shaped hooks 88 and 90 of a rack 92 connected to an overhead conveyor chain 94. In this instance, each of the leg sections 82 of the cross member 78 serves as a stop member which prevent the door handle 12 from moving sideways. In addition, the hook members 88 and 90 cooperate with the cross member 78 to maintain the appearance outer surface of the grip portion 17 of the door handle 12 properly located in a vertical plane so as to allow the paint spraying apparatus to apply a coat of paint directly onto the over-all surface of the door handle 12. Thus, as seen in FIG. 10, as the conveyor chain 94 moves the door handle 12 through a paint station, the door handle 12 is spray painted by one or more paint guns 95. Afterwards, the conveyor chain 94 moves the door handle 12 through a heat oven 96 for curing the paint deposited on the door handle. Normally the door handle 12 receives a primer coat, a finish coat, and a clear coat and after each coat the door handle 12 passes through a heat oven to cure the paint. Inasmuch as the heat oven 96 is at a high temperature, the internal stresses, which may be locked in the pivot arms 20 and 22 of the door handle 12 during the molding operation, can be relieved while the door handle 12 passes through the heat oven resulting in distortion and warpage of the pivot arms 20 and 22. However, inasmuch as the pivot arms 20 and 22 are rigidly interconnected by the cross member 78, the distortion and warpage is prevented and parallelism of the pivot arms 20 and 22 is maintained.

After the door handle 12 has been painted, the door handle 12 is located in a cutting apparatus (not shown) and the cross member 78 is severed from the body of the door handle 12 at the point where the toe section 86 meets the associated pivot arm. The door handle 12 is then ready to be assembled to a finished escutcheon to provide the door handle assembly 10 seen in FIG. 1.

Thus, it should be apparent from the above that not only does the cross member 78 of the door handle 12 maintain parallelism of the pivot arms 20 and 22 during the molding operation, it also serves the same purpose during the painting of the door handle 12. In other words, the relieving of internal stresses set up in areas such as the root area of a pivot arm at the grip portion 17 when the door handle 12 is subjected to heat at a high temperature, will not cause a distortion in the configuration of the pivot arms 20 and 22 and a loss of parallelism. Moreover, during the painting operation, the cross member 78 serves a dual function in that it not only prevents a loss of parallelism of the pivot arms 20 and 22 while the door handle 12 passes through the heat oven 96, but also serves as a mounting means for connecting the door handle 12 to the support rack 92 and holding the door handle 12 in a proper position while it is being painted.

The escutcheon 14 is also formed in an injection molding apparatus of the type used for forming the door handle 12. In this instance, the mold halves will be designed so as to provide a runner between the cavities for the support arms 36 and 38 located at one end of the escutcheon 14 and a runner between the cavities for support arms 40 and 42 located at the other end of the escutcheon 14. As a result of having a runner between the cavities which provide each pair of support arms 36, 38 and 40, 42, a pair of cross members 98 and 100 will be provided which, in each instance, rigidly interconnect the associated support arms 36, 38 and 40, 42 as seen in FIG. 6. Thus, when the pins for forming the openings 102 and 104 for the hinge pins 32 and 34 are retracted from the escutcheon support arm cavities in the mold, both pair of support arms 36, 38 and 40, 42 will maintain parallelism.

As in the case of the door handle 12, the cross members 98 and 100 associated with the support arms 36, 38 and 40, 42 of the escutcheon 14 serve to prevent the latter mentioned arms from losing parallelism during the painting of the escutcheon 14. In addition, both of the cross members 98 and 100 can be used for holding the escutcheon 14 on J-shaped hooks of a support rack when the escutcheon 14 passes through the heat oven during the painting operation. Also, after the cross members 98 and 100 have served their purpose, they are removed from the associated support arms through a cutting operation to provide the escutcheon 14 as seen in FIG. 1.

Various changes and modifications can be made in the above-described door handle components and method without departing from the spirit of the invention. Such changes and modifications are contemplated by the inventors and they do not wish to be limited except by he scope of the appended claims.

The embodiments of the invention in which an exclusive property or privilege is claimed are defined as follows:

1. A method of maintaining parallelism of a pair of arms integrally formed with and projecting outwardly from a thermoplastic automobile door handle component having an exterior surface, each of said arms having an opening formed therein during a molding operation by the withdrawal of a pin located within a mold used for forming said door handle component, said method comprising the steps of:

providing a cross member having opposed ends which rigidly interconnect said arms of said door handle component so as to prevent loss of parallelism of said pair of arms when said pin is withdrawn from each of said arms;

connecting said cross member to a support rack so as to expose the exterior surface of said door handle component;

painting the exterior surface of said door handle component;

positioning said door handle component in a heated chamber so as to cure the paint deposited on said door handle component;

removing said door handle component from said support rack; and severing the opposed ends of said cross member from said arms so as to remove said cross member from said door handle component and provide a finished component for assembly with other door handle components.

2. A method of forming a thermoplastic automobile door handle with a pair of outwardly extending arms each of which is provided with an opening therein at the outer end thereof that is aligned along a horizontal axis and formed in a mold by the retraction of a pin, said automobile door handle component having an exterior surface and an inner surface the latter of which is formed with said pair of arms; said method comprising the steps of:

forming a cross member having opposed ends integrally with said arms of said door handle component adjacent the outer ends of said arms so as to prevent loss of parallelism of said pair arms when said pin is retracted from each of said arms;

removing said door handle component from said mold and mounting said cross member onto a support rack so as to expose the exterior surface of said door handle component and prevent any sideways movement thereof;

painting the exterior surface of said door handle component with a protective coating;

passing said door handle component through a heated chamber so as to cure the paint deposited on said door handle component;

removing said door handle component from said support rack; and cutting the opposed ends of said cross member from said arms so as to remove said cross member from said door handle component and provide a finished component ready for assembly with other door handle components.

3. The method of claim 2 including the steps of providing said cross member with laterally spaced connector portions and mounting said connector portions onto said support rack for properly positioning said door handle component prior to painting thereof.

4. The method of claim 3 including the steps of painting said door handle component using spray painting apparatus and moving the door handle component from the area of the spray painting apparatus into the heated chamber for curing the paint deposited on said door handle component.

* * * * *